April 2, 1968   S. O. E. SJÖBERG   3,375,698
MACHINE FOR BENDING CUTTING DIES
Filed Jan. 4, 1966   2 Sheets-Sheet 1

INVENTOR
STEN OLOF EVALD SJÖBERG
BY ERIC Y. MUNSON
ATTORNEY

April 2, 1968　　　S. O. E. SJÖBERG　　　3,375,698
MACHINE FOR BENDING CUTTING DIES
Filed Jan. 4, 1966　　　　　　　　　　2 Sheets-Sheet 2
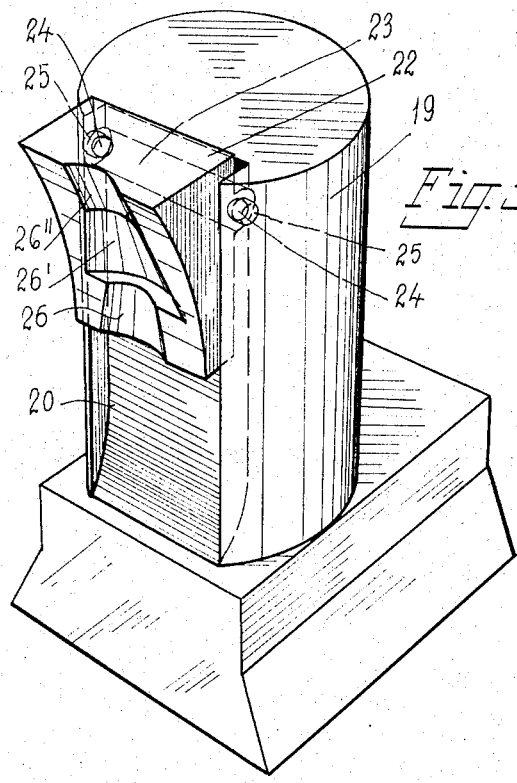
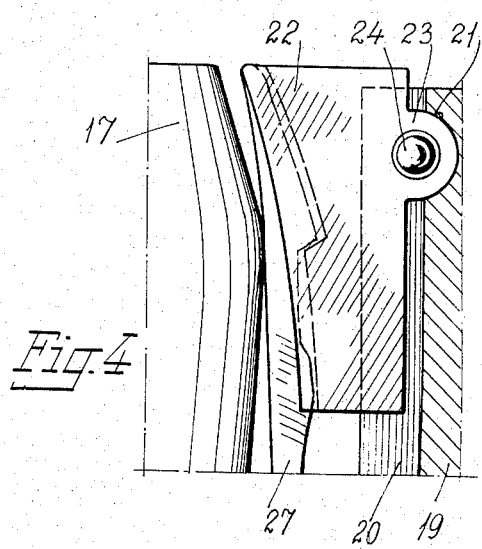
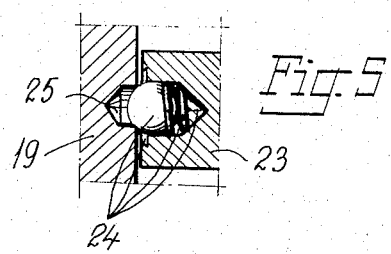
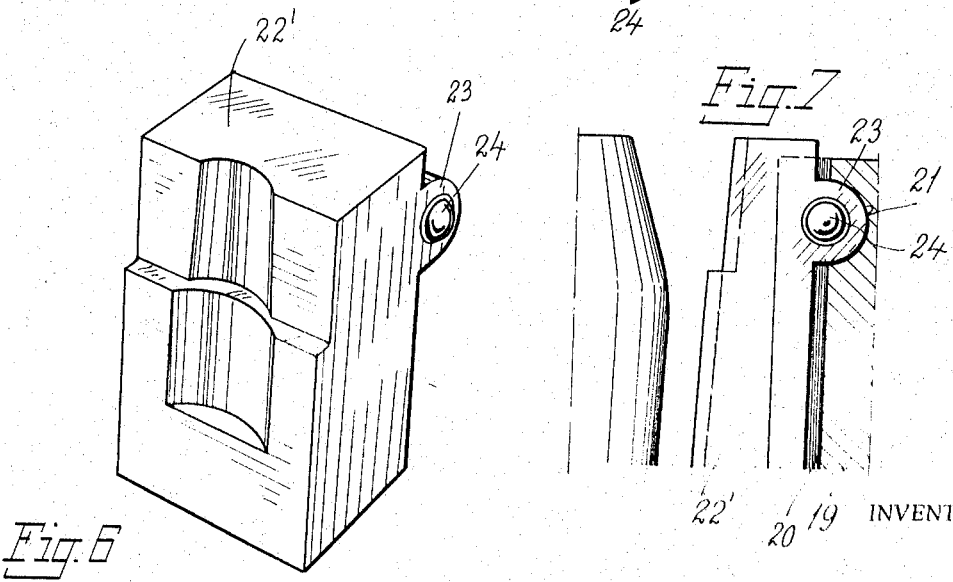
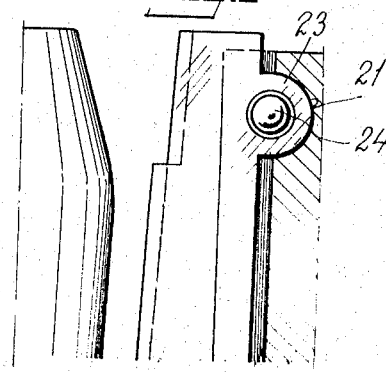
INVENTOR
STEN OLOF EWALD SJÖBERG
BY
ATTORNEY

United States Patent Office 3,375,698
Patented Apr. 2, 1968

3,375,698
MACHINE FOR BENDING CUTTING DIES
Sten Olof Evald Sjöberg, Sundbyberg, Sweden, assignor to Industriaktiebolaget Skomab, Nasbypark, Sweden
Filed Jan. 4, 1966, Ser. No. 518,707
4 Claims. (Cl. 72—471)

ABSTRACT OF THE DISCLOSURE

A power bending machine for producing cutting dies from a strip of metal and having a fixed anvil and a reciprocable beater for operating on metal strips positioned between the anvil and the beater. The anvil is provided with a pivoted support member having a strip-engaging surface which is profiled to cause the support member to pivot under the action of the beater on the strip so that the support member engages at least the edge portion of the strip throughout the bending procedure.

---

This invention relates to a device for bending of cutting and/or punching tools, particularly for use in the shoe and broadcloth industries.

Bent tools for these purposes have been used for a long time in above industries. However, the manufacturing of the tools has so far been very complicated and required highly qualified labour as well as a comparatively long time, and consequently the manufacturing costs have been rather high.

For this reason there is a long-felt and definite need for a device in a bending machine which will as far as possible eliminate the above drawbacks.

The device according to this invention fulfills this demand in a very efficient and simple manner, primarily by allowing a more pronounced mechanization of the work and the use of less qualified labour.

The device according to the invention is intended for use with a machine for bending of cutting and/or punching tools produced from blanks in the shape of elongate steel bands or the like, which machine consists of a frame provided with a plane work bench incorporating a vertically directed, pillar-shaped anvil and a reciprocating beater which acts against this anvil and is fastened to a guide that is movable by action of a piston rod arranged in a compression cylinder, and in which machine the blanks for the cutting and/or punching tools are bent at the anvil by action of the beater. The main feature of the invention is that the anvil is provided with a detachable, vertically swingable support that is directed toward the beater and provided with one or more recesses facing the beater, this support being adapted to adjust itself to a suitable contact angle relative to the tool blanks, and at least one edge portion of each tool blank being arranged to rest permanently against the support throughout the bending process.

A further feature of the invention is that the anvil is provided with engagement means in which the support can be journalled, these engagement means consisting of a groove extending in the lateral direction of the anvil and two bearings provided in the same plane with the groove.

A still further feature of the invention is that the support consists of an elongate, four-sided steel body provided on one side with a laterally extending bead intended for insertion into the transverse bearing groove, of the anvil, and with two locking members arranged to engage with said bearings.

Figure 1:
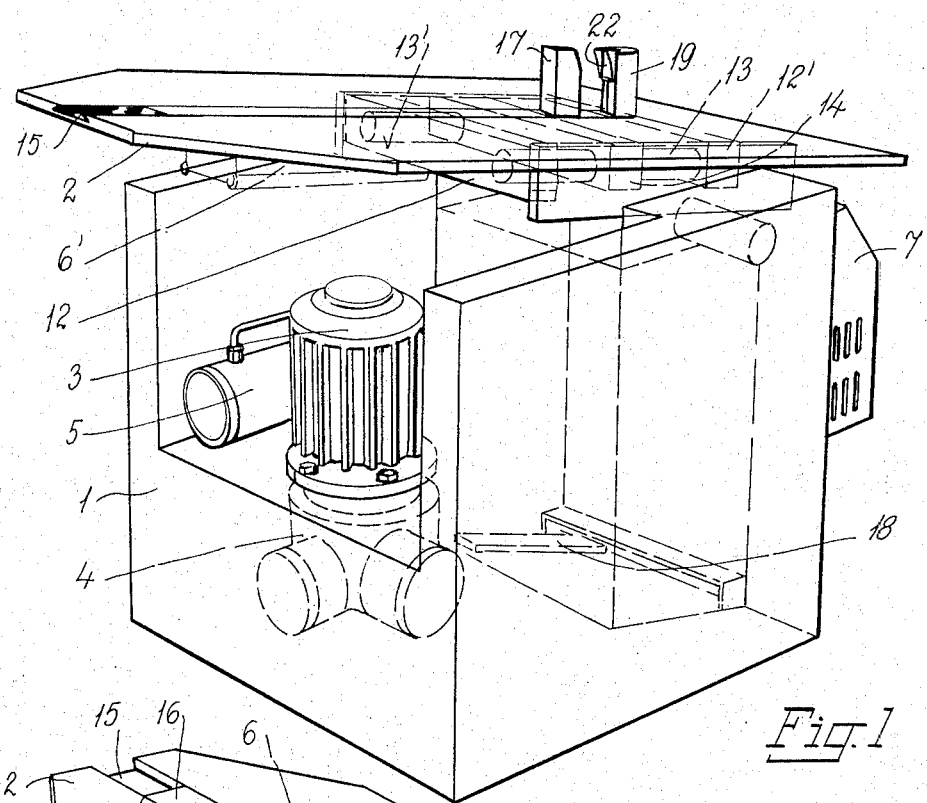
Figure 2:
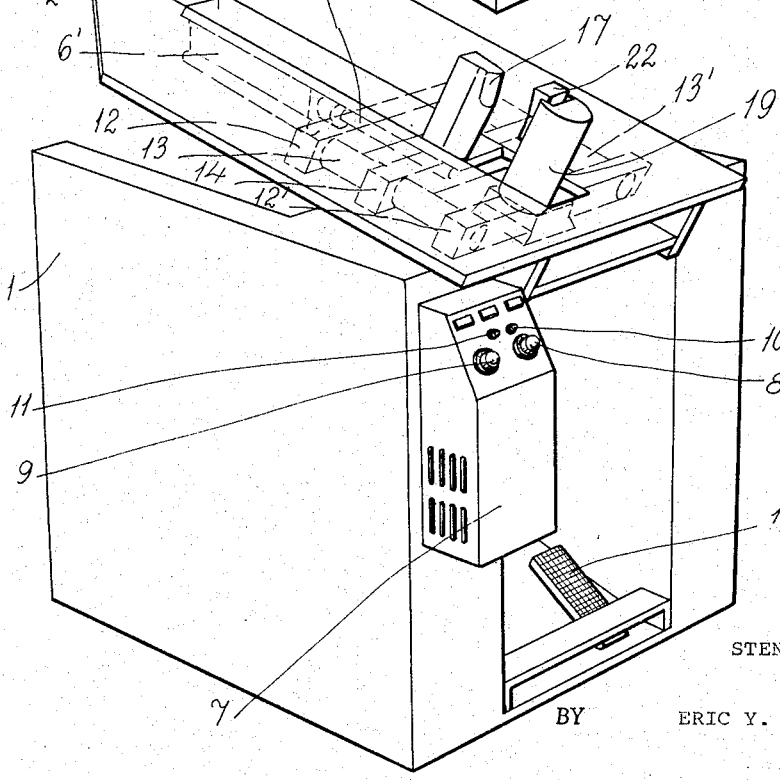

For a better understanding of the invention reference is made to the accompanying drawings, in which:
FIGURE 1 is a perspective view of the machine with the device shown from behind;
FIGURE 2 is a perspective view with the device seen obliquely from the front;
FIGURE 3 is a perspective view of the anvil and the support;
FIGURE 4 is a vertical view of a part of the beater and the anvil, as well as the support with its bearings;
FIGURE 5 is a vertical section through a bearing and a locking member provided therein;
FIGURE 6 is a perspective view of a modification of the support, and
FIGURE 7 is a vertical view of a part of the beater, the anvil and the support according to the modification shown in FIGURE 6.

Referring now to the drawing, the numeral 1 designates the frame, which is provided with a sloping, adjustable working table 2. Mounted in the frame 1 is an electro-motor 3 which drives a pump 4 of an hydraulic system consisting of a valve member 5 and a pressure cylinder 6' which is provided with a piston 6 and is governed via an electric contact system, and is mounted on the underside of the working table 2. By means of the contact system the length of stroke of the piston 6 can be adjusted with a handwheel provided in a switch gear, and its speed of stroke is adjustable by means of a similar handwheel 9. The switch gear includes push-buttons 10 and 11 for starting the machine, and for stopping it respectively.

Mounted on the underside of the table 2 is a guiding system consisting of two stationary beams 12 and 12', between which are provided two stationary guides 13 and 13'. These guides 13, 13' serve as a bearing for a guiding beam 14, which is slidable along the guides and to which is fastened a guiding rule 16 sliding in a groove 15 in the table 2. The piston rod 6 is fastened to the guiding beam 14, so that the latter will partake in the movements of the former. Detachably fastened in the guiding beam 14 is a striking tool in the form of a vertically placed, mainly triangular beater 17, which thus partakes in the movements of the guiding beam. The beater 17 is controlled by means of a pedal 18, provided in the lower part of the frame 1 and connected with the hydraulic system.

The anvil 19 is detachably fastened in the front portion of the working table 2 and is thus not movable relative to the latter. The anvil is provided with a vertically extending, elongate chute 20 that is U-shaped in the lateral direction. In the proximity of the upper portion of the anvil 19 the bottom of this chute 20 is provided with a transverse, concave groove 21, which forms a seat for a bead 23 on the support 22. The support 22 consists of an elongate, four-sided steel plate and a bead 23, which is convex in one direction and extends transversally across one side of the steel plate 22. The steel plate 22 is adapted to be inserted in the chute 20 and guided by the side edges of the latter. In the ends of the bead 23 are ball snaps 24, 24', each of which consists of a spring-actuated ball disposed in a bore. Ball and spring are retained in the bore by an annular washer. These ball snaps 24, 24' are adapted to engage with bores 25, 25', provided in the side edges of the chute 20 and constitute journals for the steel plate 22 as well as means for holding it to the anvil 19. Thanks to the ball snaps, the steel plate 22 is easily fixed to the anvil, and removed from it respectively. The steel plate is so shaped, that an inter-space is left between it and the bottom of the chute 20, when the steel plate is mounted in the anvil 19, and thus the plate is vertically swingable within a limited range. On the side facing off the bead 23, the steel plate 22 is provided with one or several concave receesses 26, 26', 26", in which tool blanks 27 can be shaped or bent by action of the beater 17. These recesses are shaped to give the tool blanks the desired external profile, and when a different profile is wanted, the steel plate 22 can be replaced by another one with recesses fitted to the purpose. Being journalled in the anvil, the steel plate 22 adjusts itself automatically to the suitable angle of inclination during the bending procedure.

When bending tool blanks 27 at a comparatively small radius of curvature a steel plate 22 is used, whose contact surface with the tool blanks is shaped like that of the steel plate shown in FIGURES 3 and 4. When the radius of curvature is comparatively large, there is used a steel plate having a contact surface with the tool blanks that is shaped like that of the steel plate 22' shown in FIGURES 6 and 7.

The device according to the invention works and is used as follows:

The beater 17 works in known manner. The tool blank is advanced manually towards the steel plate 22 or 22', and the beater 17 is brought by means of the pedal 18 to strike against the tool blank, bending the latter more or less, depending on stroke length and striking velocity as well as on the manual handling of the blank.

To obtain a smooth and plane inside on the cutting and punching tool, it has so far been necessary to use steel bands with uniform thickness all along their entire width, and this has implied the necessity of making the cutting edge of the tool only after the tool has been shaped and welded. This is a very difficult and time-wasting procedure, and particularly so because the cutting edge portion or cutting edge proper must be located somewhat inside the inner surface of the tool. Neither has it been possible so far to provide the tool with an internally conical surface by treatment in the machine, so that this work has, therefore, necessitated a manual forging operation, which requires great skill and much time.

If pre-profiled steel bands with bent-over cutting edge portion, i.e. steel bands the thickness of which varies along their width should have been bent by means of prior devices in the bending machine, the thinner portions of the steel bands, i.e. primarily the cutting edge portions would have been bent outwards and thus made it impossible to obtain a smooth and plane inner surface with an inwardly bent cutting edge in the finished tool.

According to the invention, the support and the shape of the anvil provide a self-adjusting support or stop for the thinner portions of the profiled steel band, and thus a plane and smooth surface with inwardly bent cutting edge is the transverse direction of the tool blank is always obtained. This support or stop also allows complete bending of internally conical tools (for clearance of the material when punching) in the machine without any finishing manual forging.

When the bending procedure is started, the tool blank is fed by hand towards the steel plate 22, and 22' respectively. When the beater 17, which is slightly bevelled at the top of its front edge in order not to strike against the cutting edge portion of the blank, is brought to work on the steel band, the latter swings at least partly into the concave recesses 26, 26', 26'', whereas the folding edge of the steel band which forms the cutting edge of the tool rests permanently against the contact surface of the steel plate, on both sides of the upper recess 26'', and this has for its result that the thinner portions of the steel band cannot be bent outwards but a plane surface is obtained in the lateral direction of the band except for the cutting edge portion proper, which is bent slightly inwards.

Since the steel plate 22, and 22' respectively rests against and supports the thinner portion of the tool blank, i.e. its punching and cutting portion proper, throughout the bending operation, it is possible to bend the blank in such a way that the shaped tool receives a smaller area at its punching and cutting portion than at its opposite portion, so that the tool is made internally conical and consequently a good clearance is obtained when punching out shoe soles and the like.

The invention is not confined to the embodiment described above and illustrated in the drawings, but may be modified in many ways within the scope of the inventional spirit and the following claims.

I claim:

1. A machine for bending cutting dies from metal strips comprising, a work table, an upstanding anvil secured to said work table, a power-driven beater reciprocable with respect to said anvil in a path extending in a plane substantially parallel to said work table to cooperate with said anvil for bending metal strips positioned edgewise on said work table between said anvil and said beater, a support member connected to said anvil for limited pivotal movement about an axis extending at right angles to said path and parallel to and spaced above said plane, and a strip-engaging surface on said support member, said strip-engaging surface facing said beater and being profiled to allow said support member to pivot under the action of said beater on said strip so as to engage the upper edge portion of said strip throughout the bending procedure.

2. A machine as set forth in claim 1, wherein one of said support members and said anvil are provided with two spaced first recesses facing each other and located on said pivot axis, and a partly cylindrical second recess, the longitudinal axis of which coincides with said pivot axis, and wherein the other of said support members and said anvil is provided with first and second complementary members engaging the first and second recesses respectively.

3. A machine as set forth in claim 2 wherein said one of said support members and said anvil is provided with a channel rectangular in cross section and extending at right angles to said plane, said first recesses being provided in the facing side walls of said channel and said second recess being provided in the bottom wall of said channel.

4. A machine as set forth in claim 3, wherein said first complementary members comprise spring-biased balls.

References Cited

UNITED STATES PATENTS

| 1,041,960 | 10/1912 | Christenson | 72—481 |
| 1,692,684 | 11/1928 | Nees | 72—473 |
| 2,230,490 | 2/1941 | Hamlin | 72—471 |
| 2,360,991 | 10/1944 | Ward et al. | 72—448 |
| 2,668,571 | 2/1954 | Leskiewicz et al. | 72—448 |

CHARLESS W. LANHAM, *Primary Examiner.*

E. M. COMBS, *Assistant Examiner.*